2,255,955

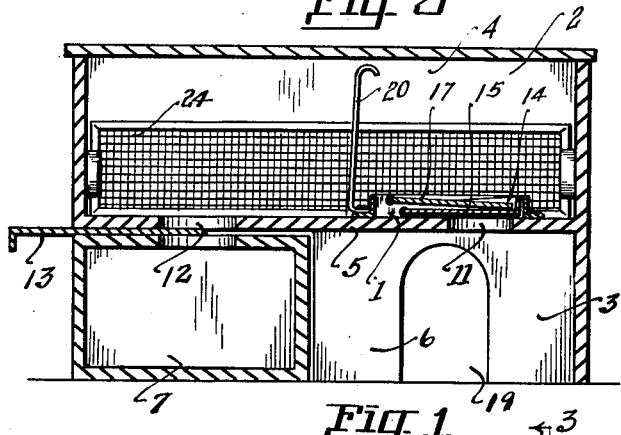
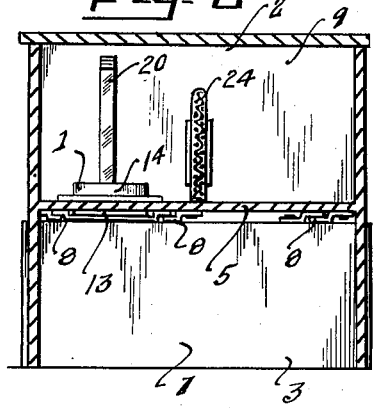
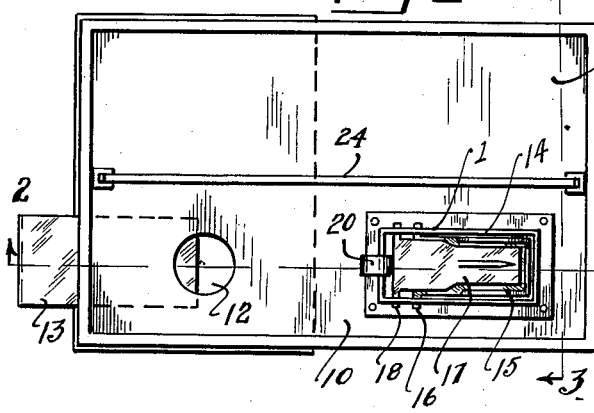
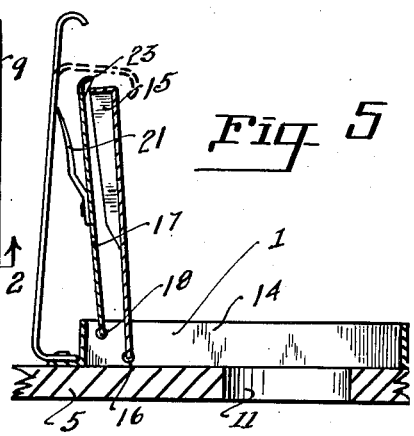
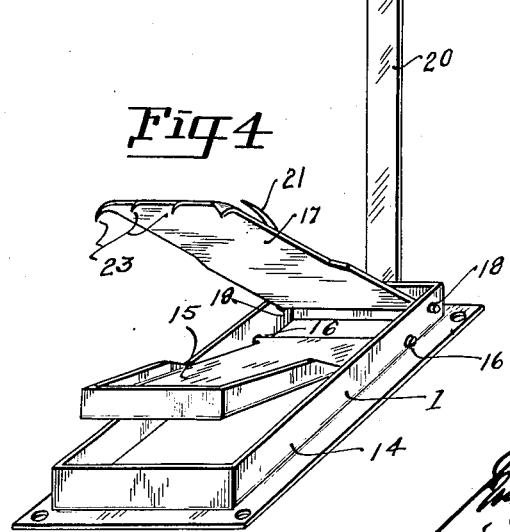
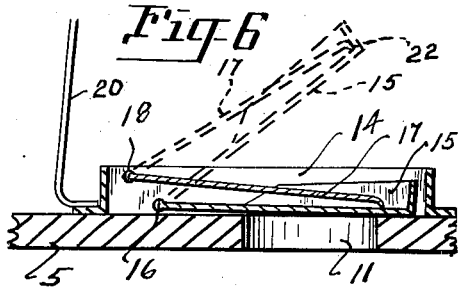
Inventor
Absolum Vickery
Attorney Patented Sept. 16, 1941

UNITED STATES PATENT OFFICE 2,255,955

ANIMAL TRAP

Absolum Vickery, Chehalis, Wash.

Application August 10, 1940, Serial No. 352,149

6 Claims. (Cl. 43—58)

This invention relates to animal traps and is particularly adapted for the trapping of rats and the like.

The primary object of the invention is to provide a trap that will catch a series of animals without requiring any re-setting of the trap by the attendant.

A further object of the invention is to provide a trap that will accustom the animals to going in or out of the trap prior to the actual trapping of the animals. This is the principal object of the invention.

In the trapping of rats and the like it has been found best results may be obtained when the animals are allowed to become familiar with the nature of the surroundings of the trap mechanism before any attempt is made to catch the animals. When the animals become thoroughly familiar with the surroundings and the animal scent connected therewith, the mechanism in my new and improved animal trap is then prepared for trapping the animals and the principles that I employ will be more thoroughly shown and described in the drawing, specification and claims.

Referring to the drawing:

Figure 1 is a plan view of my new and improved animal trap with the cover removed for convenience of illustration.

Figure 2 is a side sectional view, taken on line 2—2 of Figure 1, looking in the direction indicated with the cover in place.

Figure 3 is an end sectional view, taken on line 3—3 of Figure 1, looking in the direction indicated with the cover in place.

Figure 4 is a perspective view of my new and improved animal trapping mechanism removed from the casing.

Figure 5 is a sectional view of the trap mechanism in operating position.

Figure 6 is a sectional view of the trap mechanism in closed position.

In the drawing:

My new and improved animal trap consists primarily of a trap door mechanism illustrated in Figure 4 by the general numeral 1. This trap door mechanism may be installed in any suitable trap box 2. The trap box has a lower compartment 3 and an upper compartment 4, divided by the floor 5. The lower compartment 3 is divided into two parts, the entry chamber 6 and a removable pen 7. The pen 7 may be connected to the main box 2 by suitable interlocking slides 8 so that it can be readily removed from the trap box. The upper compartment 2 is divided into two parts 9 and 10 by the fence 24. Bait may be placed in the part 9 of the upper compartment in the form of grains and so forth, this creates a strong scent to attract the animals. Within the upper part 10 is located my new and improved trap door mechanism 1. Communicating with this trap door mechanism is an opening 11. This opening permits the animals to enter the upper compartment 2 from the lower compartment 3 which will be fully described hereafter.

After the animals enter the compartment 2 they may enter the pen 7 down through the opening 12. The opening 12 may be opened or closed by the slide 13 for the disposing of the animals.

Referring to Figure 4, my new and improved trap door mechanism consists of a main frame 14; within the frame 14 is a trap door 15 hingedly mounted to the frame 14 at 16. The trap door when closed, rests upon the floor 5 of the trap box and covers the opening 11. A secondary trap door 17 is hingedly mounted to the frame 14 at 18 and rests within the trap door 15 when the opening 11 is closed.

I will now describe the operation of my new and improved animal trap. The animal enters suitable openings 19 of the compartment 3, he may be permitted to either pass through the opening 11 freely and leave when he wishes or he may be trapped within the compartment 2. The usual procedure is first to hold the trap doors in the position shown in Figure 5. This is accomplished by bending the upright bracket 20 to the dotted position, thereby holding the trap doors 15 and 17 in open position and preventing said trap doors from being closed by the animals. The animals are allowed to enter all of the compartments within the trap box and leave when they wish, this accustoms the animals to the trap. After the animals have been accustomed to the trap mechanism they may be trapped in two different ways, first the bracket 20 may assume the position as shown in full lines in Figure 5, bait may be secured to the prong 21 of the trap door 17. In this position the trap doors are past center and rest against the bracket 20, remaining open until the animal tries to get the bait on the prong 21. In getting the bait he will force the trap doors to the right, closing them to the position shown in Figure 6.

The next animal who comes along will raise the trap doors to the dotted position shown in Figure 6. In this position it will be noted that the end 22 of the trap door 17, due to its relative location to the trap door 15, will prevent the traps from being raised above the dotted position in Figure 6 so that the animal is allowed to go through the trap door, after which the doors are allowed to fall back to the position shown in Figure 6, in full lines.

The object of the second trap door 17 is to prevent the animals from opening the trap door 15. In practice it has been found that they can open the door only if one trap door is used. If the animal should raise the trap door 17 and begin to work on the lower trap door 15, sharp points 23 of the upper door 17 will discourage him from further operations, as these points will rest on his back, causing him to abandon his attempt to open the trap door 15. This is an important feature of my invention. After the animal has entered the compartment 2 he may then enter the pen 7. In order to remove the animal the slide 13 is closed and the pen 7 is removed from the trap box.

I do not wish to be limited to the exact mechanical construction illustrated, as other forms of mechanical embodiment may be employed still coming within the scope of the claims to follow.

I claim:

1. An animal trap comprising a box-like housing formed with a horizontal division plate dividing the housing into upper and lower compartments, an opening in the plate, an entrance opening in one wall of the housing below the plate, a partition on the plate within the upper compartment terminating short of the upper wall of the compartment, and a trapping mechanism supported on the division plate, means for holding the trapping mechanism in position to free the opening in the division plate, said means being operable to permit the trapping mechanism to be moved to a position by gravity for closing the opening in the division plate.

2. An animal trap including a housing, a division plate dividing the housing in upper and lower compartments, an entrance opening for the lower compartment, an opening in the division plate leading to the upper compartment, a partition on the division plate and extending into the upper compartment and terminating short of the upper wall of that compartment, a trapping mechanism mounted on the division plate and movable to a position to close the opening in the division plate, a bait carrier on the trapping mechanism, said trapping mechanism when deflected by an attempt of the animal to remove the bait displacing the trapping mechanism to close the opening in the division plate.

3. A construction as defined in claim 2 including a strip carried by the division plate and in part movable to a position to hold the trapping mechanism in inoperative relation to the opening in the division plate, the movable part of the strip being manually adjustable to free the trapping mechanism.

4. A construction as defined in claim 2 wherein the trapping mechanism includes a plate, to close the opening in the division plate, and a secondary trap door to overlie the plate of the trapping mechanism and prevent other than a limited upward movement thereof.

5. A construction as defined in claim 2 including a second opening formed in the division plate, and a trapping container mounted on the lower plate beneath said second opening and formed with an opening to register with said second opening, and a cut-off movable with respect to the opening in the trap container.

6. A construction as defined in claim 2 wherein the trapping mechanism includes a plate to cover the first mentioned opening in the division plate, said plate having upstanding edge projections, and a secondary trap door mounted for pivotal movement with respect to the plate and having an edge to engage said upstanding projections of said plate to prevent other than a limited movement of the plate under the action of the rodent.

ABSOLUM VICKERY.